(12) United States Patent
Cortum et al.

(10) Patent No.: US 8,739,423 B1
(45) Date of Patent: Jun. 3, 2014

(54) MARKING AND LEVELING DEVICE

(76) Inventors: Robert Cortum, West Des Moines, IA (US); Jeffory D. Freed, West Des Moines, IA (US); Herbert O. Dixon, Jr., Adel, IA (US); Jonathan F. Freed, West Des Moines, IA (US)

( * ) Notice: Subject to any disclaimer, the term of this patent is extended or adjusted under 35 U.S.C. 154(b) by 227 days.

(21) Appl. No.: 13/344,337

(22) Filed: Jan. 5, 2012

Related U.S. Application Data

(60) Provisional application No. 61/431,292, filed on Jan. 10, 2011.

(51) Int. Cl.
*A47G 1/20* (2006.01)
*G01C 9/00* (2006.01)
*G01B 3/08* (2006.01)

(52) U.S. Cl.
USPC .............................................. 33/613; 33/374

(58) Field of Classification Search
USPC ..................... 33/332, 613, 374, 384, 666, 669
See application file for complete search history.

(56) References Cited

U.S. PATENT DOCUMENTS

| | | | | |
|---|---|---|---|---|
| 634,657 A | * | 10/1899 | Young ............................. | 33/368 |
| 2,993,281 A | * | 7/1961 | Dock .............................. | 33/384 |
| 4,241,510 A | * | 12/1980 | Radecki ......................... | 33/613 |
| 4,443,949 A | * | 4/1984 | Newton .......................... | 33/613 |
| 5,103,573 A | | 4/1992 | Ehling | |
| 6,029,362 A | * | 2/2000 | Miodragovic .................. | 33/666 |
| 6,421,928 B1 | * | 7/2002 | Miller ............................ | 33/520 |
| 6,430,827 B2 | * | 8/2002 | Ruther ........................... | 33/451 |
| 6,463,666 B1 | * | 10/2002 | Szumer .......................... | 33/484 |
| 6,473,983 B1 | * | 11/2002 | Gier ............................... | 33/613 |
| 6,785,977 B1 | * | 9/2004 | Crichton ........................ | 33/613 |
| 7,155,840 B1 | | 1/2007 | Carbonaro | |
| 7,210,243 B2 | * | 5/2007 | Schmidt et ..................... | 33/613 |
| 8,061,054 B2 | * | 11/2011 | Rabin ............................. | 33/613 |
| 2002/0078583 A1 | * | 6/2002 | Richardson .................... | 33/613 |
| 2002/0095812 A1 | * | 7/2002 | Newman ........................ | 33/613 |
| 2002/0189119 A1 | * | 12/2002 | High .............................. | 33/613 |
| 2003/0033722 A1 | * | 2/2003 | Lanham ......................... | 33/374 |
| 2006/0174504 A1 | * | 8/2006 | Szumer et al. ................. | 33/613 |
| 2007/0234483 A1 | * | 10/2007 | Kunz et al. ..................... | 7/143 |

\* cited by examiner

*Primary Examiner* — Christopher Fulton
(74) *Attorney, Agent, or Firm* — Zarley Law Firm, P.L.C.

(57) ABSTRACT

A marking and leveling device for assisting in the hanging of an object such as a portrait on a structure such as a wall. The marking and leveling device generally includes a central portion having a first extension extending in a first direction from a first end of the central portion and a second extension extending in a second, opposite direction from a second end of the central portion. Each of the extension members include a guide member slidably positioned thereon. Each guide member includes a support member for supporting a fastener or marking device used. A leveling assembly which includes a liquid-based leveling member is rotatably secured within the central portion of the present invention. By utilizing the leveling assembly and guide members, an operator of the present invention may accurately level and mark/fasten a structure using a single device.

19 Claims, 4 Drawing Sheets

MARKING AND LEVELING DEVICE

CROSS REFERENCE TO RELATED APPLICATIONS

I hereby claim benefit under Title 35, United States Code, Section 119(e) of U.S. provisional patent application Ser. No. 61/431,292 filed Jan. 10, 2011. The 61/431,292 application is currently pending. The 61/431,292 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a hanging assist device and more specifically it relates to a marking and leveling device for assisting in the hanging of an object such as a portrait on a structure such as a wall.

2. Description of the Related Art

Any discussion of the related art throughout the specification should in no way be considered as an admission that such related art is widely known or forms part of common general knowledge in the field.

When hanging or mounting an object a structure such as a wall, it is preferable to use a device which assists in ensuring that the object is level. Objects such as portraits, paintings, game mounts and the like can be aesthetically unpleasing if improperly hung. It can be exceedingly difficult to hang such as object from a structure in a level manner by hand.

In the past, individuals wishing to hang objects on structures have relied on straight, elongated devices such as rulers or book edges in combination with a marker to ensure the object is leveled when hung. It would be preferable to have a device which allows the leveling of an object being hung on a structure without the need for multiple tools or devices.

Because of the inherent problems with the related art, there is a need for a new and improved marking and leveling device for assisting in the hanging of an object such as a portrait on a structure such as a wall.

BRIEF SUMMARY OF THE INVENTION

The invention generally relates to a marking and leveling device which includes a central portion having a first extension extending in a first direction from a first end of the central portion and a second extension extending in a second, opposite direction from a second end of the central portion. Each of the extension members include a guide member slidably positioned thereon. Each guide member includes a support member for supporting a fastener or marking device used. A leveling assembly which includes a liquid-based leveling member is rotatably secured within the central portion of the present invention. By utilizing the leveling assembly and guide members, an operator of the present invention may accurately level and mark/fasten a structure using a single device.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
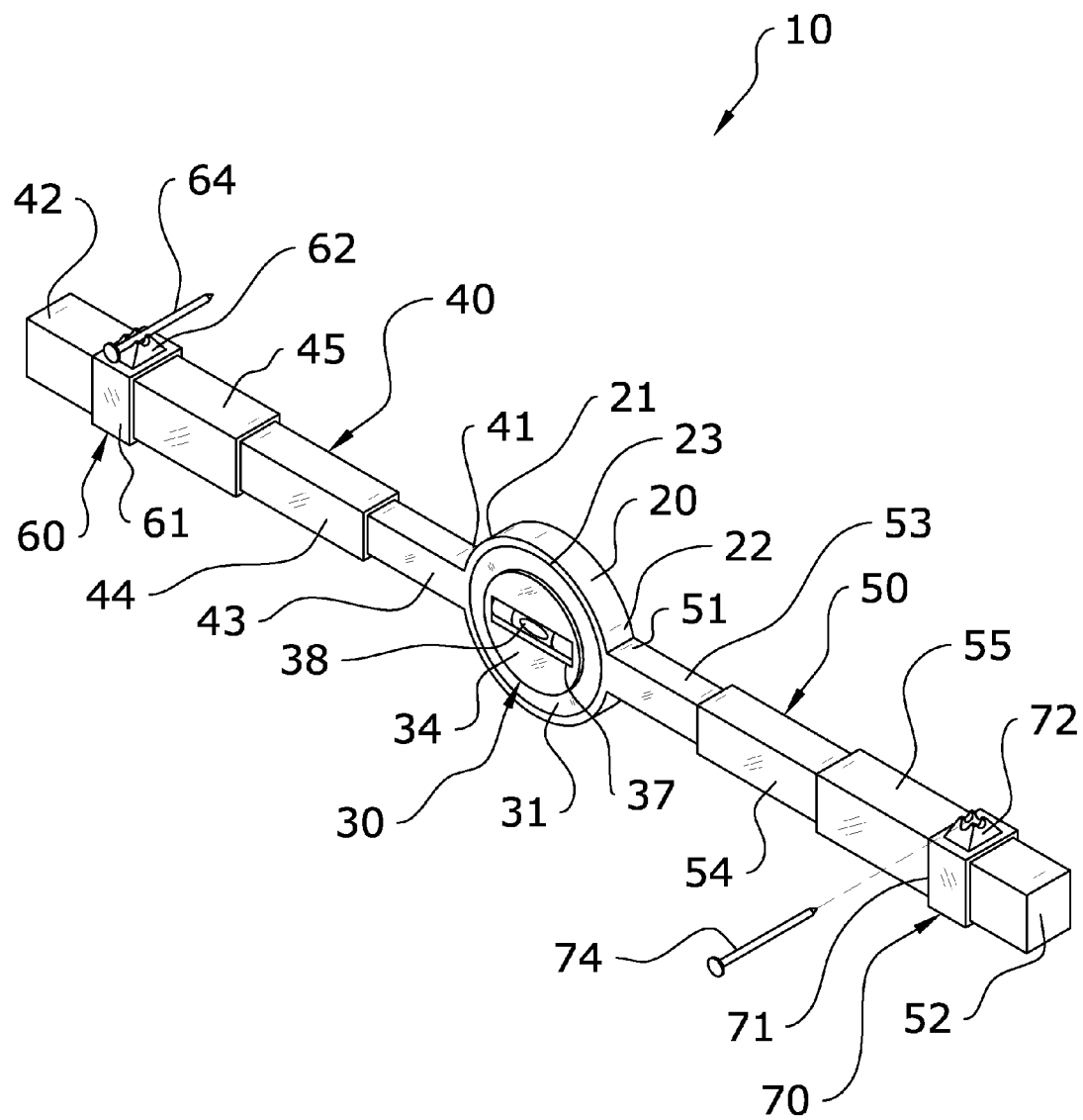
FIG. 1 is a front upper perspective view of a first embodiment of the present invention.

A. Overview.

Turning now descriptively to the drawings, in which similar reference characters denote similar elements throughout the several views, FIGS. 1 through 4 illustrate a marking and leveling device 10, which is comprised of a central portion 20 having a first extension 40 extending in a first direction from a first end 21 of the central portion 20 and a second extension 50 extending in a second, opposite direction from a second end 22 of the central portion 20. Each of the extension members 40, 50 include a guide member 60, 70 slidably positioned thereon. Each guide member 60, 70 includes a support member 62, 72 for supporting a fastener 64, 74 or marking device used. A leveling assembly 30 which includes a liquid-based leveling member 38 is rotatably secured within the central portion 20 of the present invention. By utilizing the leveling assembly 30 and guide members 60, 70, an operator of the present invention may accurately level and mark/fasten a structure using a single device.

B. Central Portion.

As shown in FIG. 1, the present invention will generally include a central portion 20 from which a pair of extensions 40, 50 extend outwardly in opposite directions. It is appreciated that the central portion 20 may be comprised of various shapes and sizes, and thus should not be construed as being limited to the exemplary round structure shown in the figures. Preferably, the central portion 20 will be fixedly secured in place with each respective extensions 40, 50 fixedly secured at either end 21, 22.

Figure 2:
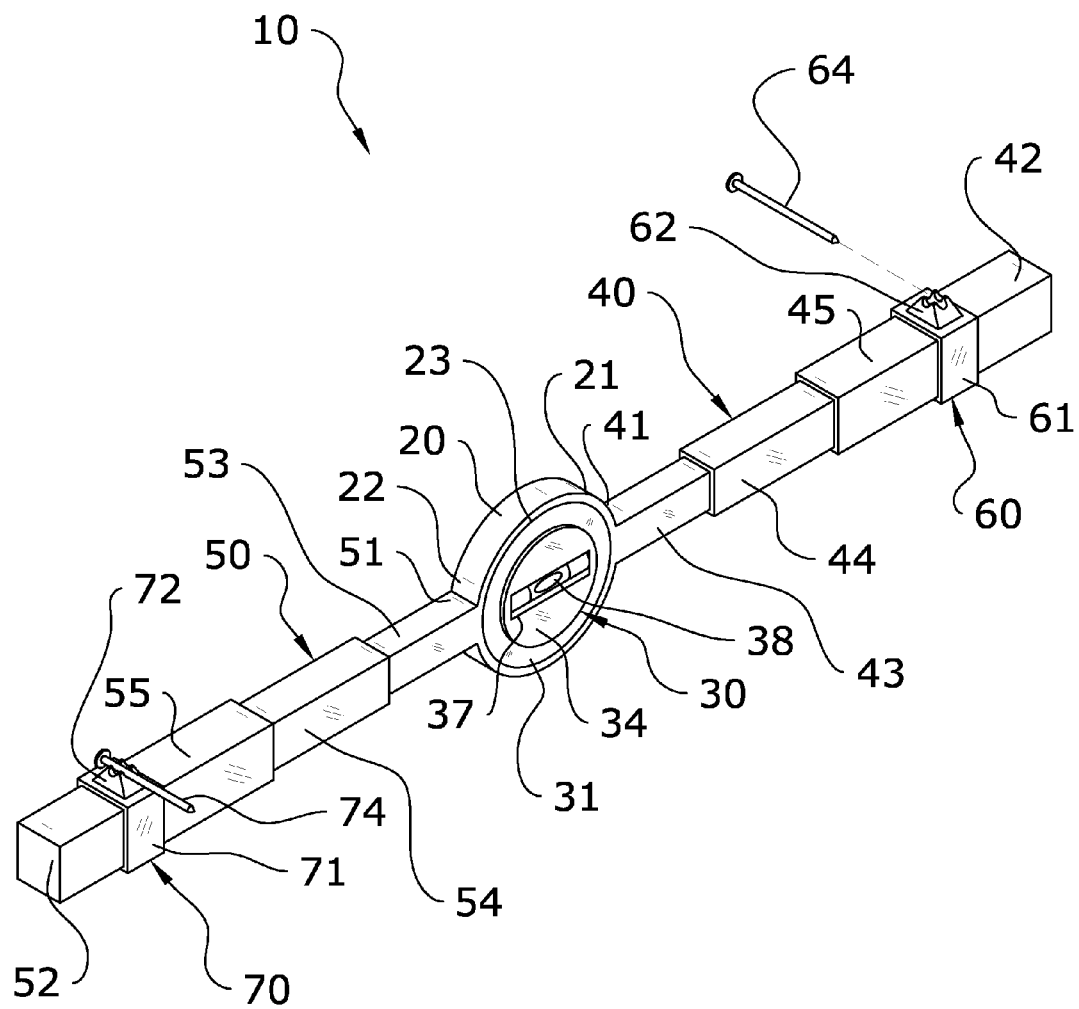
FIG. 2 is a rear upper perspective view of a first embodiment of the present invention.

The central portion 20 will generally include a first end 21 and a second end 22 which are positioned on opposite sides of the central portion 20 as shown in FIG. 2. The first extension 40 of the present invention extends from the first end 21 of the central portion 20 in a first direction and the second extension 50 of the present invention extends from the second end 22 of the central portion 20 in a second direction.

Figure 4:
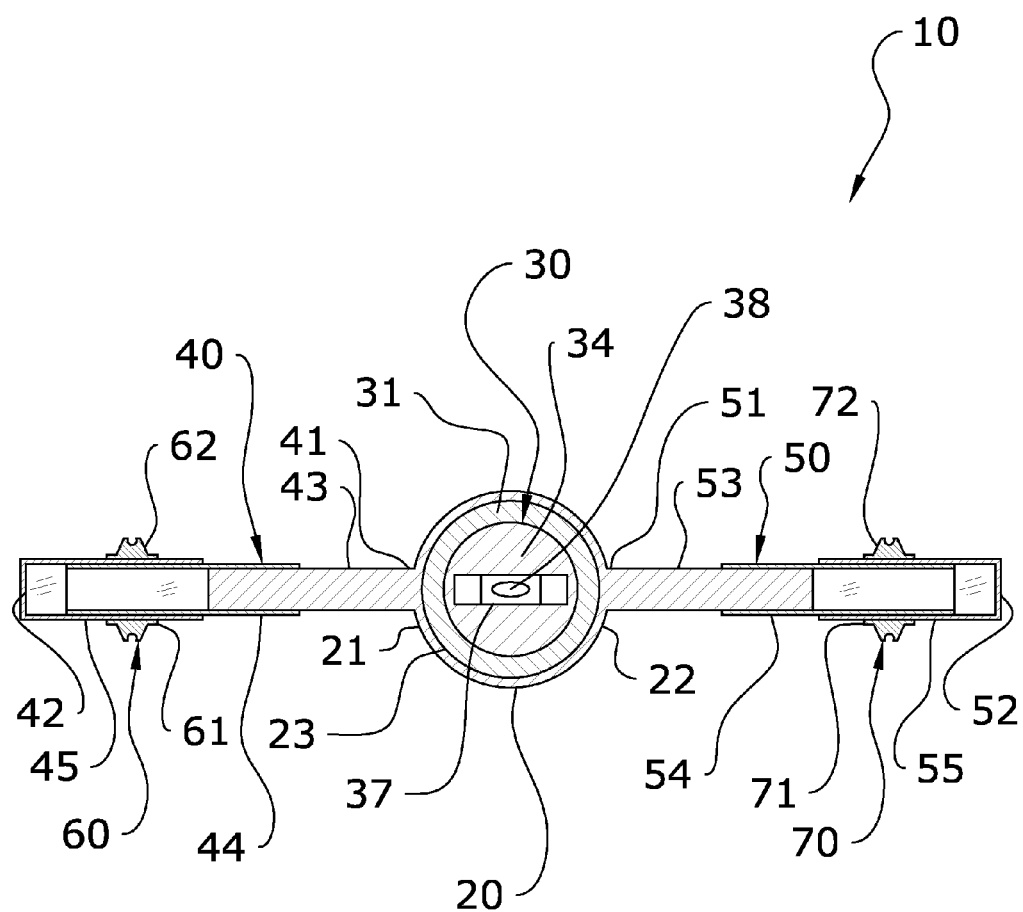
FIG. 4 is a front sectional view of a first embodiment of the present invention.

The central portion 20 will preferably include an opening 23 positioned in a central position thereof in which the leveling assembly 30 of the present invention will be rotatably positioned as shown in FIG. 4. Preferably, the leveling assembly 30 will only be movable by rotation. It is appreciated that, while the figures illustrate that the opening 23 extends fully through the central portion 20, other configurations may be utilized such as including a back wall.

C. Leveling Assembly.

As best shown in FIG. 4, the present invention includes a leveling assembly 30 for assisting with creating level hanging marks on a structure to which an object is to be secured. The leveling assembly 30 will preferably be rotatably secured within the opening 23 of the central portion 20 of the marking and leveling device 10 so that the leveling member 38 may be freely rotated on a single axis. Such a configuration allows for hanging objects on slanted structures or in unique and purposefully diagonal arrangements.

FIG. 2 illustrates a preferred embodiment of the leveling assembly 30 of the present invention, comprised of a rotation member 34, a raised outer rim 31 along the outer circumference of the rotation member 34 and a slot 37 formed in the outer surface of the rotation member 34 to accommodate a leveling member 38. Such a configuration allows for more precise movement of the leveling assembly 30 as it rotates within the opening 23 of the central portion 20 of the present invention as shown in FIG. 4. It is appreciated, however, that other arrangements may be utilized for the leveling assembly 30 so long as the leveling member 38 may be freely rotated for precision.

The rotation member 34 of the present invention is preferably comprised of a circular, disk structure which is rotatably secured within the central portion 20 of the present invention. However, it is appreciated that other shapes may be utilized so long as the leveling assembly 30 may freely rotate within the central portion 20. By including a raised outer rim 31, an operator of the present invention may more easily grasp and rotate the leveling assembly 30 when using the present invention.

Figure 3:
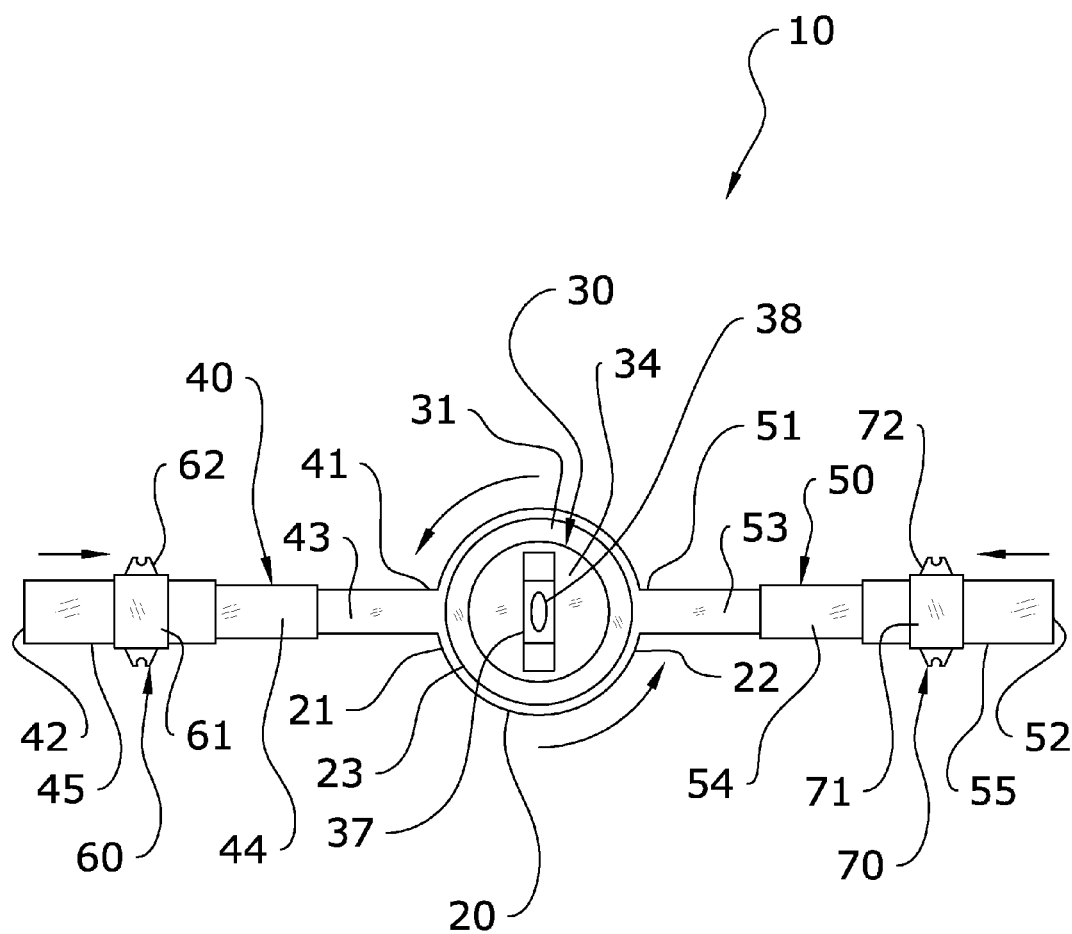
FIG. 3 is a front view of a first embodiment of the present invention.

As shown in FIG. 3, the leveling assembly 30 will preferably include a slot 37 in which the leveling member 38 of the present invention is positioned. In a preferred embodiment, the slot 37 will be positioned on a central location of the outer face of the rotation member 34.

The leveling member 38 may be comprised of various types of leveling aids which are known in the art. Preferably, as shown in the figures, a liquid leveling member 38 comprised of a transparent canister filled with a fluid such as alcohol which includes a pair of markings indicating absolute center will be utilized. However, the present application should not be construed as being limited to this type of leveling member 38.

D. Extensions.

As shown in FIG. 1, the present invention includes a pair of extensions 40, 50 which extend linearly in opposite directions from the central portion 20 of the present invention. Preferably, a first extension 40 comprised of an elongated, straight structure will extend in a first direction from the first side 21 of the central portion 20 of the marking and leveling device 10. A second extension 50 comprised of an elongated, straight structure will extend in a second direction from the second side 22 of the central portion 20 of the present invention.

As shown in FIG. 4, the extension members 40, 50 preferably extend in opposite directions with respect to each other. When the central portion 20 is comprised of a circular configuration as exemplified in the figures, a first end 41 of the first extension member 40 will be positioned to a point which is 180 degrees from the point at which a first end 51 of the second extension member 50 extends.

It is appreciated that, in a main embodiment, the central portion 20, first extension member 40 and second extension member 50 may be integrally formed of a single, unitary structure. In other embodiments, the central portion 20, first extension member 40 and/or second extension member 50 may be comprised of discrete structures which are fixedly or removably attached to each other.

Preferably, each of the extensions 40, 50 will be telescopically adjustable as shown in the figures. Thus, the extensions 40, 50 may be retracted to compact the present invention for storage. As shown in FIG. 2, the first extension 40 will preferably be comprised of a first member 43, a second member 44 and a third member 45. The first member 43 will be fixedly secured to the first end 21 of the central portion 20. The second member 44 will be slidably positioned around the first member 43 and the third member 45 will be slidably positioned around the second member 44. Thus, the first extension 40 will be telescopically adjustable. It is also appreciated that, in some embodiments, the arrangement may be reversed (i.e. second member 44 slidably positioned within first member 43, third member 45 slidably positioned within second member 44).

Similarly, the second extension 50 will preferably be comprised of a first member 53, a second member 54 and a third member 55. The first member 53 will be fixedly secured to the second end 22 of the central portion 20. The second member 54 will be slidably positioned around the first member 53 and the third member 55 will be slidably positioned around the second member 54. As with the first extension 40, it is appreciated that, in some embodiments, this arrangement may be reversed. Thus, the second extension 50 will be telescopically adjustable. It is appreciated that various other configurations may be utilized to allow the extensions 40, 50 to be telescopically adjustable.

As shown in FIG. 1, each of the extensions 40, 50 will preferably include at least one guide member 60, 70 for use in marking positions on a structure or aligning fasteners for hanging an object in a level manner. As shown in FIG. 3, the first extension 40 includes a first guide member 60 slidably positioned thereon and the second extension 50 includes a second guide member 70 slidably positioned thereon.

The first extension 40 will preferably include a first guide member 60 slidably positioned thereon. The first guide member 60 is comprised of a first collar 61 which extends at least partially around the first extension 40 as shown in FIG. 1. A first support member 62 is preferably positioned on the first guide member 60. A first fastener 64, such as a nail, may be inserted within the support member 62, which preferably includes an aperture of slot for supporting such a fastener 64. In other embodiments, the first support member 62 may be adapted for use in combination with a marking device such as a pen or pencil.

Similarly, the second extension 50 will preferably include a second guide member 70 slidably positioned thereon. The second guide member 70 is comprised of a second collar 62 which extends at least partially around the second extension 50 as shown in FIG. 1. A second support member 72 is preferably positioned on the second guide member 70. A second fastener 74, such as a nail, may be inserted within the second support member 72, which preferably includes an aperture of slot for supporting such a fastener 74. In other embodiments, the second support member 72 may be adapted for use in combination with a marking device such as a pen or pencil.

It is also appreciated that, in some embodiments, the first guide member 60 may be fixedly secured to the distal end 42 of the first extension 40 and the second guide member 70 may be fixedly secured to the distal end 52 of the second extension 50. In other embodiments, each extension may include a combination of fixedly secured and slidably secured guide members 60, 70. For example, the first extension 40 could include a first guide member 60 slidably positioned thereon and a second guide member (not shown) fixedly positioned at a distal end 42 thereof.

E. Operation of Preferred Embodiment.

In use, an operator of the present invention will align the leveling and marking device 10 on a structure such as a wall to which an object is to be mounted. The operator may telescopically adjust the extension members 40, 50 for proper positioning. The leveling assembly 30 may be rotated into proper position and then the guide members 60 may be utilized to identify the locations on the structure at which the holes, brackets or the like may be located for optimal positioning and orientation of the mounted object.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A marking and leveling device, comprising:
   a central portion, wherein said central portion includes a first end and a second end;
   a first extension extending from said first end of said central portion in a first direction;
   a second extension extending from said second end of said central portion in a second direction; and
   a leveling member rotatably positioned within said central portion;
   a first guide member slidably positioned on said first extension;
   a second guide member slidably positioned on said second extension;
   wherein the first extension is slidably engaged with the central portion;
   wherein the second extension is slidably engaged with the central portion;
   a fastener removably securable within said first guide member.

2. The marking and leveling device of claim 1, wherein the first extension and the second extension are non-round and matingly engage the central portion such that the first extension and the second extension maintain angular alignment with the central portion as they slid upon the central portion between a retracted position and an extended position.

3. The marking and leveling device of claim 1, wherein the first extension and the second extension have a cross section that is generally square or rectangular in shape.

4. The marking and leveling device of claim 1, wherein said first guide member and said second guide member are each comprised of a collar and a support member extending from said collar.

5. The marking and leveling device of claim 1, wherein said first guide member extends fully around said first extension.

6. The marking and leveling device of claim 1, wherein said leveling member is positioned within a leveling assembly.

7. The marking and leveling device of claim 6, wherein said leveling assembly is comprised of a rotation member having a raised outer rim.

8. The marking and leveling device of claim 1, wherein said second guide member extends fully around said second extension.

9. The marking and leveling device of claim 8, further comprising a marker removably secured within said first guide member.

10. The marking and leveling device of claim 1, wherein said leveling member is comprised of a liquid-based leveling member.

11. The marking and leveling device of claim 1, wherein said first extension member and said second extension member are each adjustable.

12. The marking and leveling device of claim 11, wherein said first extension member and said second extension member are each telescopically adjustable.

13. A marking and leveling device, comprising:
   a central portion, wherein said central portion includes a first end and a second end;
   a first extension extending from said first end of said central portion in a first direction;
   wherein the first extension is slidably engaged with the central portion to slidably extend in the first direction;
   wherein the first extension extends from a first end to a second end;
   a second extension extending from said second end of said central portion in a second direction;
   wherein the second extension is slidably engaged with the central portion to slidably extend in the second direction;
   wherein the second extension extends from a first end to a second end;
   a first guide member slidably positioned on said first extension;
   wherein the first guide member slides a length of the first extension between the first end of the first extension and the second end of the first extension;
   a second guide member slidably positioned on said second extension; and
   a leveling assembly rotatably positioned within said central portion.

14. The marking and leveling device of claim 13, wherein each of said guide members is comprised of a collar and a support member.

15. The marking and leveling device of claim 13, wherein the second guide member slides a length of the second extension between the first end of the second extension and the second end of the second extension.

16. The marking and leveling device of claim 13, wherein said leveling assembly includes a slot extending therethrough and further comprising a leveling member positioned within said slot.

17. The marking and leveling device of claim 16, wherein said leveling assembly is comprised of a rotation member having a raised outer rim.

18. A marking and leveling device, comprising:
   a central portion, wherein said central portion includes a first end and a second end, wherein said central portion is comprised of a circular configuration;

a first extension extending from said first end of said central portion in a first direction, wherein said first extension is comprised of a linear, elongated member;

wherein the first extension is slidably engaged with the central portion to slidably extend in the first direction;

wherein the first extension extends from a first end to a second end;

a second extension extending from said second end of said central portion in a second direction, wherein said first end of said central portion is 180 degrees from said second end of said central portion, wherein said second extension is comprised of a linear, elongated member;

wherein the second extension is slidably engaged with the central portion to slidably extend in the second direction;

wherein the second extension extends from a first end to a second end;

a first guide member slidably positioned on said first extension;

a second guide member slidably positioned on said second extension;

a leveling assembly rotatably positioned within said central portion, wherein said leveling assembly is comprised of a rotation member; and a liquid-based leveling member positioned within a slot.

19. The marking and leveling device of claim 18, wherein the second guide member slides a length of the second extension between the first end of the second extension and the second end of the second extension.

\* \* \* \* \*